United States Patent [19]

Popescu

[11] 4,454,463
[45] Jun. 12, 1984

[54] ELECTROMOTIVE DRIVE

[76] Inventor: Florian R. Popescu, Ringstrasse 15, D-1000 Berlin 45, Fed. Rep. of Germany

[21] Appl. No.: 195,299

[22] Filed: Oct. 8, 1980

[30] Foreign Application Priority Data

Oct. 15, 1979 [DE] Fed. Rep. of Germany ....... 2942073

[51] Int. Cl.$^3$ .............................................. H02K 7/02
[52] U.S. Cl. .......................................... 322/4; 320/72
[58] Field of Search ......................... 320/61, 72; 322/4

[56] References Cited

U.S. PATENT DOCUMENTS

| | | | |
|---|---|---|---|
| 3,792,742 | 2/1974 | Mager | 320/61 X |
| 4,218,624 | 8/1980 | Schiavone | 320/61 X |

*Primary Examiner*—William M. Shoop
*Attorney, Agent, or Firm*—McGlew and Tuttle

[57] ABSTRACT

An electrical motor-generator with a pulse-type power supply has a special flywheel with controlled radial pulsed satellite freebodies, freemasses, or pistons. The invention also features a permanently active drive function at current-interruption intervals of the batteries or main supply as they regularly recur about once per second. This motor is especially suited for roadway vehicles with battery power supplies, which would then be recharged partially through the current-generating function of this electromotive device during the above-mentioned current-interruption intervals, in particular as a result of the intermittently-occurring flywheel power energy surplus. The device features radially moving pistons mounted to an armature and wound with coils which are connected to the controls of the device. Each piston is biased in an inward direction by a biasing spring. The control system applies electricity to the coil windings to provide control for each piston in an inward and outward direction, during the cyclic rotation of the armature.

5 Claims, 3 Drawing Figures

ELECTROMOTIVE DRIVE

FIELD AND BACKGROUND OF THE INVENTION

The invention relates to an electromotive drive, particularly for vehicles with storage batteries, substantially comprising an armature, a stator, and an electrical control and steering gear for pulsed operation.

In electromotive drives for vehicles with storage batteries, it is known to utilize the work of braking to recover energy in a multiquadrant operation. With the use of conventional DC motors, however, the recovered or useful energy is extremely small because the periods of braking do not amount to a sufficient total to ensure a necessary time for even partly recharging the storage batteries.

SUMMARY OF THE INVENTION

The invention is directed to an electromotive drive of the above-mentioned kind which saves electric energy during its operation at constant performance and thus to spare the storage batteries and, in addition, to recover electric energy during the braking or downhill run periods.

Accordingly, an object of the invention is to provide an electromotive drive for vehicles which use storage batteries that comprises an armature, a stator, an electrical control for providing pulses and radially movable pulsing masses supported by radial spring means with electric coil windings associated with each mass and to which the electrical control is connected for receiving electrical impulses and controlling the position of the mass to move it radially inwardly or outwardly during the rotation of the armature.

By controlling their radial motion electrically or electromagnetically and with an adjusted operating speed, the masses can work in resonance equilibrium in accordance with the known principle of the resonance pulsation torque motor with a continual radial force compensation in any position between the centrifugal forces and the centripetal spring forces. In such a motor the masses are so arranged and dimensioned that by means of a DC pulse changer, the necessary timing of the tangential parametric acceleration resonance excitation by the windings of the electric motor is even maintained during the centrifugation of the masses. This makes it possible to double or triple the frequency of pulsation at the instant of a greater perfomance or acceleration.

Therefore, higher power-energetic kinetic total amounts can be delivered by the armature during the backward oscillatory or pulsatory centripetal motion of the masses toward the drive shaft due to a temporary increase of the flywheel like reactive-active driving torque sustaining the angular momentum, with the drive or battery current being completely interrupted during these partial periods of mass oscillation. During the alternating, purely electromotive partial periods of mass centrifugation, the current energy instantaneously taken from the storage battery, for example, may always amount to about the double of the normal theoretical average consumption of operating energy of the rated power. This additional storage serves as reserve energy for the oppositely directed, inertial partial periods. Basically, contrary to the usual function of a flywheel, and in order to maintain the isocyclic quality of an inertial power-integration system, no appreciable deviations from the rated operating rotational speed occur. Only the rheonomical variation of the momentum $GD^2$, take place. In principle, only a shift takes place to higher kinds of oscillatory dynamic equilibriums, i.e. of stationary effects expressed by the dimension-analytic space-time terms $\rho L^6 T^{-2}$ and $\rho L^7 T^{-3}$ at which, with a constant speed, the mechanical damping is energetically utilized, partly with a co-stimulating effect, as in a harmonic compulsory excitation of a parametrically-resonating oscillator capable of self-excitation.

During the just mentioned partial periods of mass centrification which always take about a third of the duration of a complete period of oscillation, electomagnetically effective currents flow through the coils encircling the masses, to move the masses quickly outwardly. This varies with time, in accordance with the frequency and with a parametric, resonance excitation. During rotation of the armature at the operating speed, the masses are displaced in accordance with the necessary cycle once or several times per second. On the other hand, the normal function of the electromotive drive becomes effective at the same time due to the overdimensioned lead from the power source, so that energy for the acceleration variable in time of the heavy armature in sychronism with the outwardly sliding heavy masses is supplied in addition. The moment of inertia or rotative moment $GD^2$ increases with time simultaneously, in accordance with the known, only modified, differential equation for electric DC motors.

During the above described phases and a generating operation, and within the partial periods in which the masses move back to the output shaft, any rotary energy in excess produced by terminating the acceleration braking or by a slight downhill run of the vehicle is continually directed by the electrical control, through an interconnected, also accumulating, capacitor circuit and, if necessary, through transformers and a smoothing rectifier, to the storage battery, for permanent recharging purposes.

Consequently, amounts of electric energy may thus be recovered by a controlled movement of the masses during the run at the operating speed, and returned to the storage battery. This automatically provides the possibility of reducing the total weight of the storage battery.

The inventive electromotive drive operates isocyclically and automatically. It is capable of being macro- and micro-parametrically resonant and is to be considered rheonomically as an open system, wherefore it is able to absorb field energy from the ambience, if necessary, to temporarily maintain its oscillatory stability. Further, the drive possesses active masses of its own and may intermittently transform own endergy into exergy. Theoretically, on the contrary, an machine properly is only a converter and should not have any mass or energy of its own. The invention discloses a continuous progression of possible higher kinds of stationary effects, differing from the presently known one and from the space-time dimension-analytic term $\rho L^5 T^-$ (impulse effect), namely the progression $\rho L^6 T^{-2}, \rho L^7 T^{-3}, \rho L^8 T^{-4}$, etc. With a constant operating speed and while maintaining low torques admissible in view of the potential resonance, the double controlled cyberntic drive here described assisted by the pulsatory operation and a DC pulse changer adjusting the frequency, make it possible finally to come to the stationary effect $\rho L^8 T^{-4}$ at which a harmonic compulsory excitation of the parametrically excited oscillator capable of self-excitation takes place and, at larger amplitudes, even the mechanical damping or load torque is partly utilized as excitation energy.

BRIEF DESCRIPTION OF THE DRAWINGS

In the following, the invention is explained in more detail with reference to an embodiment shown in the drawing in which.

DESCRIPTION OF THE PREFERRED EMBODIMENT

Figure 1:
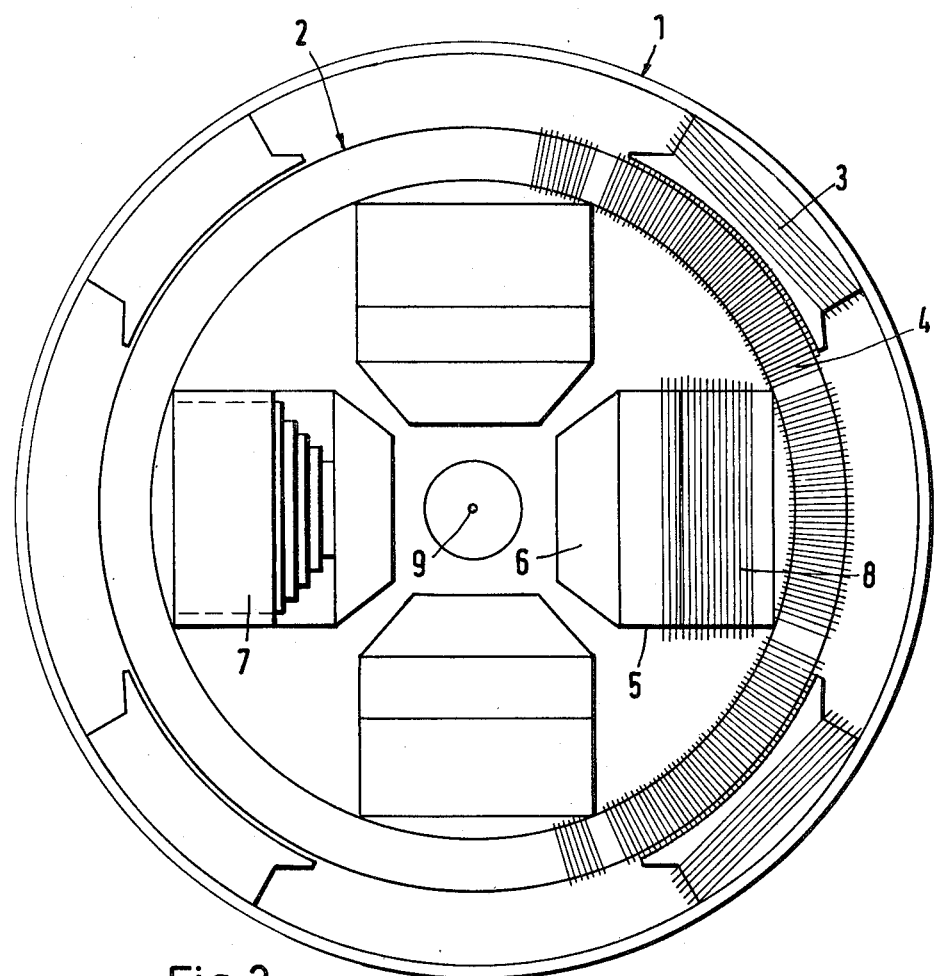
FIG. 1 is an illustration of the principle of an electromotive drive with a resonance pulsation torque motor comprising an armature according to the invention.

In a known resonance pulsation torque motor (German OS No. 21 43 461 and German OS No. 24 15 308, inventor F. R. Popescu) only a parametrically resonating, active, radial pulsatory excitation of radially oscillating heavy masses. The heavy masses are formed by free pistons 6 as shown in FIG. 1, with counteracting resilient elements in the form of frustoconical springs 7. in this design, the equilibrium of the masses or pistons is indifferent at operating speed, for any radius of rotation. This resonance pulsation torque motor is now employed to form a core part of an armature 2 of a shunt-wound DC motor having a stator 1. The motor may be driven by storage batteries, for example.

The rotor 2 is mounted, in a known way, for rotation within the stator 1 which has four poles 3 whose windings cooperate in a known manner with the windings 4 of rotor 2. The four masses shown in the form of truncated free pistons 6, are mounted within radial cylinders 5 and urged radially inwardly toward the axis of rotation 9 of armature 2, by resilient means in the form of springs 7 of frustoconical shape. Frustoconical springs 7 are so dimensioned that with an operating speed of the electric motor of 2,000 or 3,000 RPM, for example, the masses in the form of free pistons 6 are just in a radial, indifferent, statical-dynamic equilibrium at any radius of rotation. During the shorter partial periods of the radial oscillations of the masses or free pistons, (centrifugal motion) the electromagnetic coils 8 encircling each radial cylinder 5 serve the purpose of moving the masses or free pistons 6 within the provided fragments of seconds quickly toward the outside, for an exact steered or controlled effect. At the same time, the main electric current from a storage battery or another voltage source, is fed in a pulsed manner, to simultaneously produce a short tangential rotational rotary acceleration in an electromotive way, by means of the windings of poles 3 and windings 4 of armature 2. Consequently, at the same time, by means of the control (FIG. 2), or steering gear which is particularly a semiconductor device, the DC pulse changer is induced to provide for the respective necessary radial oscillation frequencies of the pistons as mentioned above, about once, twice or three times per second. During the longer intermediate periods of centripetal motion of the pistons also mentioned above, which also takes place intermediately, the law of uniform twist or impulsive momentum preservation provides for the necessary drive torque while the current is interrupted. An alternative flywheel-like controlled drive is thus obtained.

Figure 2:
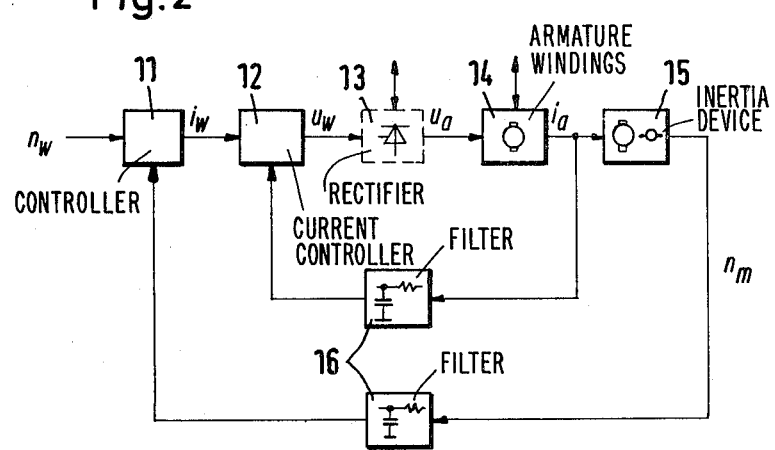
FIG. 2 is a diagram of a drive control of the electro-resonance pulsation torque motor according to the invention.

The diagram of FIG. 2 illustrating the drive control for constant rotational speed and of the electro-resonance pulsation torque motor shows an n-controller 11 (for speed), an i-controller 12 (for current), a rectifier 13 for static devices, the windings 4 of armature 2 shown at 14, a moment of inertia device 15, and a filter 16. The reference inputs are: $n_w$ for the stationary, i.e. operating speed, and $i_w$ for current; the controlled variables are $i_a$, the current, and $n_m$, the speed. For a stationary state of the control, the reference input $n_w$, or desired value, requires a certain condition to be satisfied, for example, maintaining a constant speed of armature 2. This is checked by measuring the desired and actual values. If an error is found, the error signal is processed and the result appears at the output of the controller as a reference value for the control circuit. In the diagram, a position controller predetermines the desired and speed value $n_w$, speed controller 11 predetermines the reference value proper $i_w$ for the current control circuit. Consequently, the power section $(u_w)$ is controlled by current controller 12.

Figure 3:
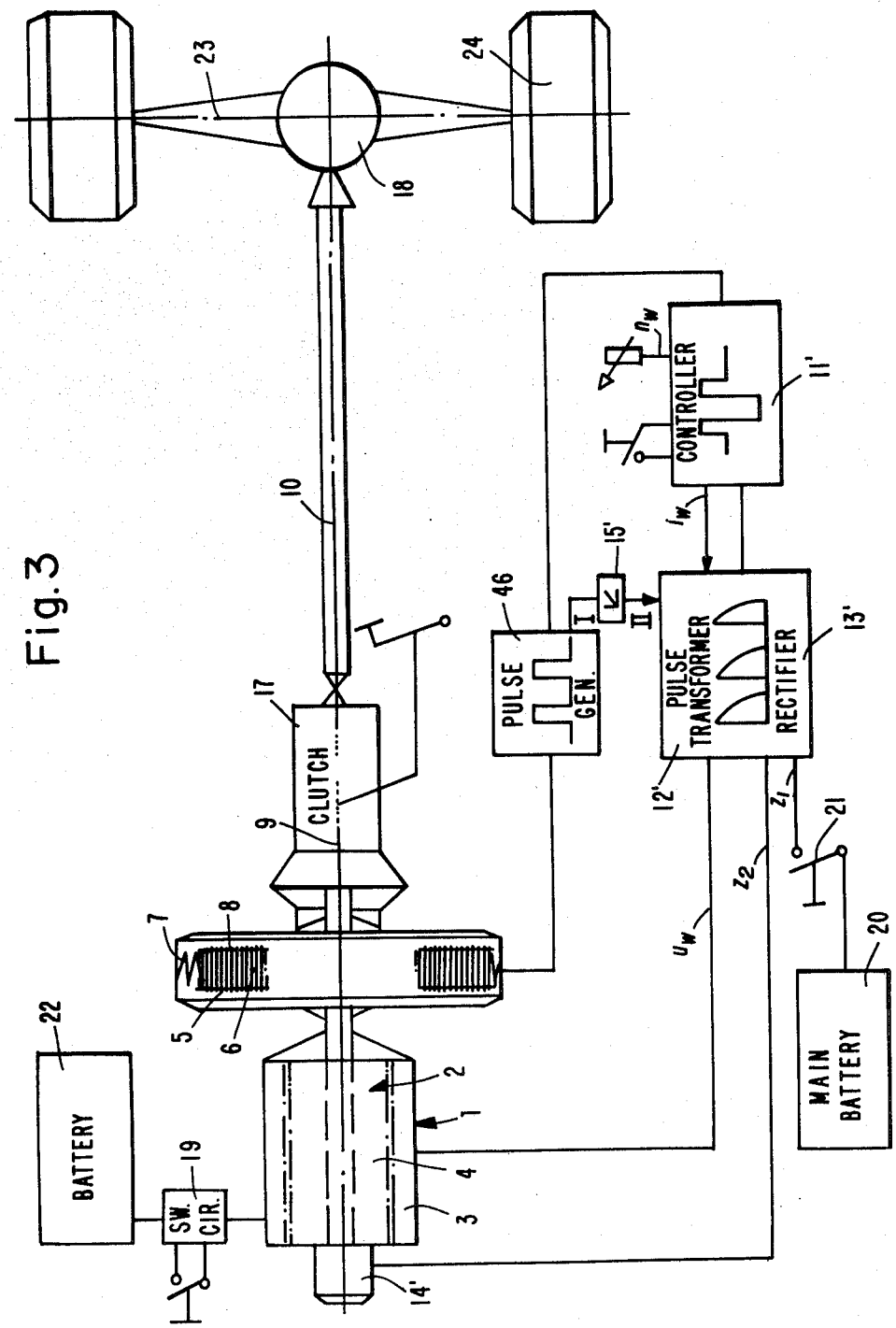
FIG. 3 is a diagram of the invention used on a vehicle.

FIG. 3 schematically shows a vehicle with clutch 17 connected to the shaft of rotor 2 having axis 9. Clutch 17 is connected through a drive shaft 10 through a differential 18 which in turn is connected through axles 23 to wheels 24.

The motor-generator made up of rotor 2 with windings 4 and stator 1 with poles 3 drive the drive shaft 10 when they are activated by batteries 20 and 22. The torque of the fly wheel assembly made up by elements 5 through 8 can be varied advantageously through the movement of free pistons 6 which experience a radially inward force through springs 7 and a radially outward force by coils 8 when the coils are energized by pulses from pulse generator 46. Pulse generator 48 in FIG. 3 is used instead of filters 16 in FIG. 2.

Pulse generator 46 provides a pulsating control of the three pistons 6 and also controls the speed controller device 11'. Speed controller device 11' receives its speed information $n_w$ over a potentiometer shown in FIG. 3 for example. The input speed value $n_w$ controls the duration of pulses generated by controller 11', which pulses are supplied as a current signal $i_w$ to the dc pulse transformer 12', corresponding to the current controller 12 in FIG. 2. Pulse transformer 12' incorporates the current rectifier 13' which receives power labelled $Z_1$ from main battery 20 over a switch mechanism 21. The moment of inertia device 15' can be in the form of a potentiometer connection 15' connected between the pulse generator 46 and the current controller 12'. Potentiometer connection 15' can provide start up power which is almost double the desired current value II, by integrating the otherwise sawtooth pulses of pulse generator 46 indicated at I. 14' in FIG. 3 designated an alternator or tachometer associated with the rotor coils 4. This provides directional value for the instantaneous speed of the motor-generator which is labelled $Z_2$ and is kept substantially constant.

The instantaneous values of the speed correspond to the actual value of the rotor current. This is input to the current controller 12' to modify the power value $u_w$ supplied to the motor-generator.

Battery 22 is provided for a separate excitation of the motor-generator in multi-quadrant operation and with a substantially constant excited field. Battery 22 is connected to the motor-generator through a switch circuit 19. Usually battery 22 is taxed less than the main battery 20. The single lines connecting batteries 20 and 22 to the motor-generator serve not only to power the motor-generator but also to charge the batteries using excess power when the motor-generator acts as a generator through the dynamics of flywheel assembly 5 through 8.

I claim:

1. An electromotive device, particularly for vehicles having storage batteries, comprising:

a stator having a plurality of stator windings thereon;

an output shaft rotatably mounted with respect to said stator;

an armature connected to said shaft having a plurality of armature windings thereon which interact with the stator windings when electricity is applied to the stator and armature windings;

electrical control means connected to said stator and armature windings for providing pulses of electricity thereto to cause rotation of said armature with respect to said stator;

a plurality of radially movable pulsation masses distributed equally around said armature and connected to said armature for radial movement with respect to said shaft;

spring means connected to said armature and engaged with each of said pulsation masses for biasing each pulsation mass radially inwardly of said armature;

said electrical control means operable to cause rotation of said armature at an operating speed, with each of said pulsation masses moving according to a principal of resonance pulsation torque motors with a radial outwardly directing centrifugal force experienced by each pulsation mass counteracted by a biasing force of each associated spring means;

a coil winding wound about each pulsation mass for receiving electrical impulses to control the position of each pulsating mass;

each coil winding connected to said electrical control means and said electrical control means operable to supply electrical impulses to each coil winding to cause each pulsation mass to cyclically and quickly be displaced radially outwardly during rotation of said armature at its operating speed.

2. An electromotive drive, according to claim 1, characterized in that the masses are designed as free moving pistons (6) mounted within radial cylinders (5) which are encircled by the electrical coil windings (8).

3. An electromotive drive, according to claim 1 characterized in that all the spring means are springs of frustoconical shape (7).

4. An electromotive drive, particularly for vehicle with storage batteries comprising a rotary armature with windings, a stator with windings fixed with respect to the armature and a control for pulsed operation, wherein the armature (2) being connected to an output shaft and includes radially movable and pulsating heavy free pistons (6), spring means biasing each piston radially inwardly, and which pistons at an established rated operational rotational speed and in any position of the pistons, move on known principle of a resonance pulsation torque motor with a radial force compensation between centrifugal forces and spring forces reactive thereto by said spring means, and which pistons are so arranged and dimensioned that by means of a DC pulse changer, the tangential parametric acceleration resonance excitation by windings of the device is also maintained during centrifugation of the free pistons (6) so that at instants of increase performance or acceleration of the vehicle, the frequency of pulsation is doubled or tripled, and that as free pistons (6) move back toward the output shaft (9) of the device during the oscillatory or pulsatory motion, also higher power-energetic kinetic total amounts are delivered by the armature (2) due to a temporary increase of a flywheel-like reactive-active effect, only driving torque of the armature sustaining angular momentum thereof with battery current being interrupted during these partial periods of the piston oscillation and the current energy instantaneously drawn from the battery being always approximately doubled, relative to the normal, average theoretical consumption of operating energy, during the alternating purely electromotive partial periods of piston centrifugation, while, contrary to the usual flywheel function and in order to maintain an isocyclic quality of an intertial-power integrating system, no appreciable deviations from the designed rated speed occur, and only a shift to higher kinds of oscillatory dynamic equilibriums takes place at which, if the speed is constant, even mechanical damping, partially simultaneously exciting, is energetically utilized, particularly at a harmonic compulsory excitation of a parametrically resonant oscillator capable of self-excitation, and further that during the last mentioned partial periods of piston centrifugation which always take about a third of the entire period of oscillation, on the one hand, branch currents having an electromagnetic effect flow through appropriately dimensioned windings encircling radial cylinders which slidably accommodate the free pistons and the corresponding springs, to energize them while also varying in time according to the frequency and parametic resonance, and to move the pistons quickly outwardly and displace them in accordance with the necessary cycle once or several times per second during the rotation of the armature at the operating speed, and, on the other hand, the normal function of an electric motor takes effect due to the overdimensioned supply line from the source of power, so that also the additional energy for the simultaneous acceleration varying in time of the heavy armature with the heavy metallic masses of the pistons sliding outwardly, thus with the moment of inertia or flywheel moment $GD^2$ increasing in time, is produced, in accordance with the known, but modified, differential equation for electric motors, and finally that during the generating operation, within the partial periods in which the pistons move back toward the output shaft, any rotary energy in excess instantly produced by stopping the acceleration is continuously directed by an automatically operating semiconductor control forming the control of the device, through an interconnected, also accumulating, capacitor circuit as well as through necessary transformers and a smoothing rectifier, to the storage battery, for permanent recharge.

5. An electomotive drive according to claim 4, characterized in that the core part of the armature (2) comprising the pistons (6) is disposed directly aside the electric motor and firmly connected thereto.

* * * * *

UNITED STATES PATENT OFFICE
CERTIFICATE OF CORRECTION

Patent No. 4,454,463　　　　　　Dated June 12, 1984

Inventor(s) Florian R. Goetsch

It is certified that error appears in the above-identified patent and that said Letters Patent are hereby corrected as shown below:

On the title page item [76] the name of the inventor should be --Florian R. Goetsch Signed and Sealed this Second Day of April 1985

[SEAL]

Attest:

DONALD J. QUIGG

Attesting Officer　　　Acting Commissioner of Patents and Trademarks